United States Patent

[11] 3,600,748

| [72] | Inventors | Knud Faehndrich<br>Fort Lee, N.J.;<br>Edmund Lindner, Ludwigshafen am Rhine,<br>Germany |
|---|---|---|
| [21] | Appl. No. | 820,731 |
| [22] | Filed | May 1, 1969 |
| [45] | Patented | Aug. 24, 1971 |
| [73] | Assignee | BASF Corporation<br>New York, N.Y. |

[54] EXTRUSION DIE
5 Claims, 3 Drawing Figs.

| [52] | U.S. Cl. | 18/12 DM |
|---|---|---|
| [51] | Int. Cl. | B29f 3/00 |
| [50] | Field of Search | 18/12 A, 12<br>DM, 13 D, 30 RC, 30 RH, 30 RM |

[56]  References Cited
UNITED STATES PATENTS

| 3,212,132 | 10/1965 | Westlake | 18/12 |
|---|---|---|---|
| 3,222,719 | 12/1965 | Wagner et al. | 18/12 |

*Primary Examiner*—Francis S. Husar
*Attorney*—Johnston, Root, O'Keeffe, Keil, Thompson & Shurtleff

ABSTRACT: Extrusion die embodying a heated rear section, a cooled front section with a plurality of extrusion orifices therein, passage means extending through the heated rear section for feeding thermoplastic polymer melt to the orifices, means such as an air space insulating the cooled front section from the heated rear section, and thin-walled, melt-conducting ring gaskets bridging the space between said sections.

Patented Aug. 24, 1971 3,600,748
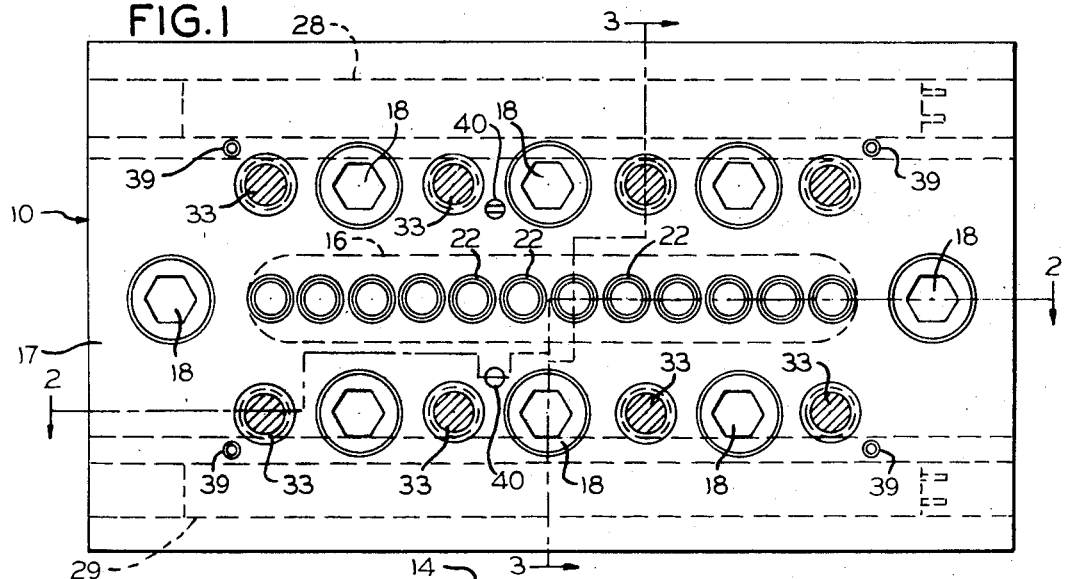
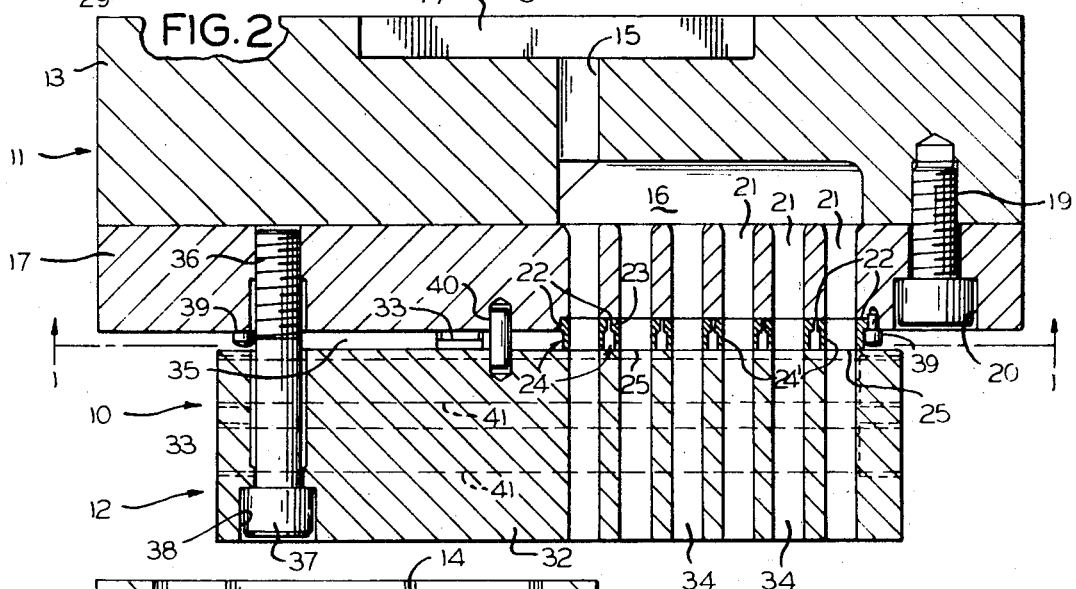
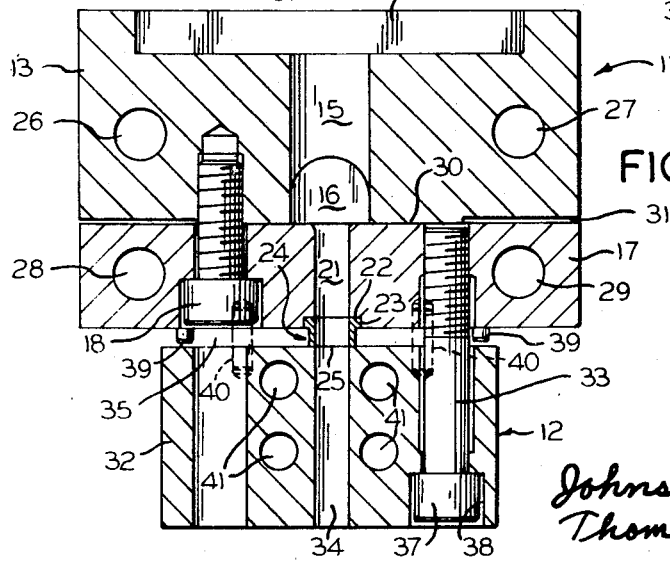
INVENTORS
KNUD FAEHNDRICH
EDMUND LINDNER
BY Johnston, Root, O'Keefe, Keil
Thompson & Shurtleff ATTY'S

EXTRUSION DIE

INTRODUCTION

The subject invention concerns improvements in extrusion dies used for extrusion of thermoplastic polymer rods, sheets, tubing and the like. Improvements attainable by the invention include increase of production capacity of extrusion machines by increase of rate of maximum flow through the extrusion die of the extruded polymer melt. Other advantages reside in improvements in the homogenity of the surface of the extrusion, which improvements are attributable to the cooling section of the die.

BRIEF DESCRIPTION OF THE INVENTION

The subject invention concerns dies used in the extrusion of thermoplastic polymers, such as polyamides such as polyhexamethylene adipamide, polyhexamethylene sebacamide, polycaprolactam, polycapryllactam, and the like; polyacetals; polyolefins such as polyethylene and polypropylene; polystyrene; styrene interpolymers such as acrylo-nitrile-butadiene-styrene interpolymers (ABS plastics); polyvinyl chloride, polycarbonates; and blends or mixtures thereof. The extrusion dies embody the rear heating section and a front cooling section. The polymer melt is extruded through the front cooling section in one or more extrusion orifices after being fed to said orifices through the rear heating section. In a preferred form of the invention, the rear heating section comprises one or two heat-conducting metal blocks or plates with a passage or passages therethrough. The polymer melt is forced from the extrusion screw section of the machine through the passages of the plate or plates. The latter are heated by heating elements connected to or contained in said plate or plates whereby the extruded material is heated as it passes therethrough.

The front section of the extrusion die contains one or more extrusion orifices in communication with the passage or passages in the rear section. It preferably is a heat-conducting metal plate or block and has connected thereto or provided therein means for cooling the front plate.

It is essential for purposes of the subject invention to insulate the cooled front section from the heated rear section. This may be done by providing between opposing faces thereof an airgap or a space filled with a heat-insulating material and preferably also the use of thin-walled, metal ring gaskets bridging said airgap or space.

The invention and its advantages will be further understood and appreciated from the following description of a preferred embodiment of the invention which is illustrated in the drawings.

DESCRIPTION OF THE DRAWINGS

FIG. 1 is a front elevation, as viewed from section plane 1–1 of FIG. 2, of the rear section of the extrusion die;

FIG. 2 is a cross section of the extrusion die, taken on section planes 2–2 of FIG. 1; and FIG. 3 is a cross section of the extrusion die taken on section planes 3–3 of FIG. 1.

DESCRIPTION OF PREFERRED EMBODIMENT

Referring to the drawings, the extrusion die 10 comprises a rear section or member 11 and a front section or member 12. The rear section 11 is composed of two plates or blocks 13 and 17 in face to face relationship. The rear face of the plate or block 13 has a circular recess 14 into which thermoplastic polymer from the extrusion machine is fed. This polymer flows into the axial passage 15 and thence into the elongated, laterally directed manifold passage 16, which is formed as a groove in the front face of the rear plate or block 13.

The front plate 17 is coupled to the rear plate 13 by bolts 18. The threaded shank 19 of bolts 18 is threaded in tapped holes in the front face of rear plate 13, and the heads of the bolts 18 are recessed or flush with the front face of plate 17 by virtue of their positioning in the counterbores 20 in the front face of plate 17.

The front plate 17 has a plurality of axial orifices or passages 21 extending from the front to rear faces thereof. The rear portions of these passages communicate with the manifold passage 16, from which the polymer melt is fed into the bores or passages 21. Counterbores 22 are provided in the front face of plate 17 coaxial with respective passages 21. These counterbores serve as seats for the respective bases or flanges 23 of the metal ring gaskets 24. These ring gaskets bridge the air space 35 between the cooled front section 12 and the heated rear section 11. The ring gaskets 24 are made of a strong metal such as steel. As can be seen in FIG 2, the tubular segments 24' thereof are thin walled. The downstream circular ends 25 are the only contact points by which direct heat transfer can occur via gaskets 24 between heated section 11 and cooled section 12. The wall thickness of the circular ends 25 and/or the tubular segment 24' is small, e.g., as low as 0.1 mm., whereby the direct heat transfer between sections 11 and 12 is minimal due to the small contact areas of ends 25 with the rear face of cooled section 12.

The rear plate or block 13 has a pair of passages 26 and 27 extending therethrough. The heating fluid may be circulated therethrough for the purpose of maintaining the rear plate or block 13 at the desired temperature. The front plate or block 27 has a similar pair of passages 28 and 29 for the same purpose, i.e., the circulation through the plate or block 17 of a heating fluid to maintain said plate or block at the desired elevated temperature.

Other heating means such a electrical heating elements may be used, however.

If desired, a small air space 31 may be provided between the plates 13 and 17 whereby the only portion of said plates or blocks in actual face to face contact is the axial center portion 30 thereof.

The front section 12 of the extrusion die comprises an orifice plate or block 32 connected to the plate 17 by bolts 33. It has a plurality of extrusion orifices 34 in respective axial alignment with the passages 21. The ring gaskets 24 bridge and seal the space therebetween. The seal is achieved by tightening bolts 33, the threaded shanks 36 of which are threaded in tapped holes in the front face of plate or block 17. The heads 37 of said bolts preferably are accommodated in counterbores 38 in the front face of the metal orifice plate or block 32. Bolts 33 are drawn sufficiently tight to effect a fluidtight seal between the flanges 22 and counterbores 23 and also between the circular ends 25 and the rear face of the plate or block 32.

The wall thickness of the tubular segments 24' of the ring gasket 24 is to be kept as small as possible in order to create an optimum of resistance to the heat conductance therethrough. The minimum wall thickness of the gasket depends on its permissible pressure load by the bolts 33. The force of the bolts 33 has to be at least as much as the product of extrusion pressure times the inner surface of the ring gaskets 24 times the number of gaskets. Furthermore, the gaskets are dimensioned in such a fashion that they do not burst under the extrusion pressure.

As an example, a gasket having an inside diameter of one-fourth inch and capable of withstanding an extrusion pressure of 100 atmospheres calls for a preload for the gasket of at least 32 kg. Considering a permissible tensile stress of 50 kg./mm.$^2$ within the gasket, theoretically the wall thickness of the gasket should be approximately 0.064 mm. under the preload of the bolts 33. This gasket is under a pressure load of approximately 13 kg./mm.$^2$. Assuming a height of 3 mm. for the gasket consisting of an alloyed steel, and a temperature difference of 520° F. versus 25° F. between the two temperature zones would result in a heat flow of 44 watts through the gasket. With regard to safety performance in an actual application, this gasket would be dimensioned slightly larger; for instance 0.5 to 1.0 mm. Consequently, the heat transfer is increased accordingly. It is preferred, for purposes of minimizing the heat transfer via the ring gaskets 24 to provide wall thicknesses thereof in the order of 0.1 to 2.0 mm.

In lieu of making the ring gaskets 24 as separate members, such ring gaskets can be made integral with either the front face of the plate 17 or the rear face of the orifice plate or block 32 by machining a shoulder or collar about the respective orifices or passages 21 or 34. In such case the ring-shaped shoulders or collars should be of the same thin-walled dimensions as heretofore described with respect to ring gaskets 24.

Four small bolts 39 may be threaded in the front face of plate or block 17, the projecting heads of which may be used to limit the drawing together of front section 12 and rear section 11 by the bolts 33. Guide pins 40 may also be provided to align said sections. The bores or passages 41 in the orifice plate or block 32 provide passages for circulation of a cooling liquid through the plate or block 32. The assembly of the orifice plate or block 32 and the plate 17 may be removed from the rear section 11 by removing bolts 18. This makes the distributor channel 16 readily available for cleaning without the necessity of disassembly of the front section members 17 and 32. Similarly, if necessary, the orifices or passages 21 and 34 may be cleaned while the front and rear sections are separated.

The orifice plate or block 32 has a plurality of passages 41 for the flow of cooling medium such as brine therethrough to maintain the plate or block 32 at a temperature considerably below the temperature of the rear section 11.

By way of comparative examples, extrusions on the same extrusion machine were made with a previously known die maintained at elevated temperature without a cooling section and also with a die having the structure of the invention herein. The extruder was a 1¼-inch extruder with a customary three-section screw. The specifications thereof were: feed section 7D; transition section 4–5D; metering section 9–8D; uniform pitch of approximately 1D; compression of screw 1:3.5; depth of flight $h_1$.236 inch $h_2$.078 inch; multicavity die, 12 rods of one-fourth inch each.

With the known die, 12¼-inch rods of Ultramid KR1183, a high-viscosity nylon 6,6, were extruded. The temperatures used in the extrusion were: cylinder I 460° F., cylinder II, 520° F. and cylinder III, 540° F. The die temperature was 520° F. The r.p.m. of the screw was 25. The attained capacity of extrusion was 2.5 kg. per hour.

For the same extruder and with no additional changes in processing, 12 ¼-inch rods of the same polyamide were extruded on a machine having the extrusion die of the subject invention, i.e., as illustrated in the drawing herein. Production capacity increased 50 percent. The cooled section 12 of the die was maintained at 25° F., using brine as the cooling fluid. The r.p.m. of the screw was increased to 50. Inasmuch as the extruded polyamide flowed more smoothly, it was not necessary to brake as frequently as was the case with the extrusion through the known die. The surfaces of the extruded polyamide rods were much more homogeneous than was the case with the known die. This improvement is attributed to the cooling of the die of the subject invention in the die section 12.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A die for extruding polymer melts comprising a rear section and a front section, a plurality of extrusion orifices in said front section, passage means extending through said rear section for feeding polymer melt to said orifices and including passages aligned with respective orifices in said front member, means to heat said rear section, means to cool said front section, said front section being spaced from said rear section, and thin-walled, metal ring gaskets of low thermal conductivity bridging the space between said sections and respectively connecting said orifices and said passages respectively aligned therewith.

2. A die as claimed in claim 1 wherein said rear section comprises a front metal plate and a rear metal plate in face-to-face contact, said passages extending between the front and rear faces of said front plate, and said passage means further including a manifold passage in said rear plate and communicating with said passages.

3. A die as claimed in claim 2 wherein said orifices are arranged in a line across said front member, and said manifold passage is an elongated passage extending across said rear section and communicating with all of said aligned passages in said rear section.

4. A die as claimed in claim 1 wherein said space is a thermal-insulating airgap between said front and rear sections.

5. A die as claimed in claim 1 wherein said ring gaskets have wall thicknesses in the range of 0.1 to 2.0 mm.